United States Patent
Verscheure et al.

(10) Patent No.: US 9,976,313 B2
(45) Date of Patent: May 22, 2018

(54) METHOD FOR LAYING PARQUET FLOORING WITH IMPROVED DIMENSIONAL STABILITY

(75) Inventors: Eric Verscheure, Vernou la Celle sur Seine (FR); Laurent Nery, Noisy le Grand (FR)

(73) Assignee: BOSTIK S.A., Courbevoie (FR)

( * ) Notice: Subject to any disclaimer, the term of this patent is extended or adjusted under 35 U.S.C. 154(b) by 28 days.

(21) Appl. No.: 13/996,032

(22) PCT Filed: Nov. 25, 2011

(86) PCT No.: PCT/FR2011/052761
§ 371 (c)(1),
(2), (4) Date: Jul. 11, 2013

(87) PCT Pub. No.: WO2012/085376
PCT Pub. Date: Jun. 28, 2012

(65) Prior Publication Data
US 2013/0291469 A1    Nov. 7, 2013

(30) Foreign Application Priority Data
Dec. 22, 2010 (FR) .................................. 10 61016

(51) Int. Cl.
| | | |
|---|---|---|
| *B32B 21/08* | (2006.01) | |
| *B32B 27/26* | (2006.01) | |
| *B32B 27/38* | (2006.01) | |
| *B32B 27/40* | (2006.01) | |
| *C09J 163/00* | (2006.01) | |
| *C09J 171/02* | (2006.01) | |
| *C09J 175/04* | (2006.01) | |
| *C09J 183/00* | (2006.01) | |
| *C08G 59/24* | (2006.01) | |
| *C08G 59/40* | (2006.01) | |
| *E04F 15/02* | (2006.01) | |
| *C08G 65/336* | (2006.01) | |

(52) U.S. Cl.
CPC ...... *E04F 15/02155* (2013.01); *C08G 59/245* (2013.01); *C08G 59/4042* (2013.01); *C08G 65/336* (2013.01); *C09J 163/00* (2013.01)

(58) Field of Classification Search
None
See application file for complete search history.

(56) References Cited

U.S. PATENT DOCUMENTS

| | | | |
|---|---|---|---|
| 5,684,094 A | 11/1997 | Suzuki et al. | |
| 5,889,124 A | 3/1999 | Ando et al. | |
| 6,833,423 B2 | 12/2004 | Roesler et al. | |
| 2004/0092640 A1* | 5/2004 | Makino et al. | 524/425 |
| 2004/0127671 A1 | 7/2004 | Roesler et al. | |
| 2006/0058451 A1* | 3/2006 | Gommans et al. | 524/588 |

FOREIGN PATENT DOCUMENTS

| | | |
|---|---|---|
| EP | 0671437 A1 | 9/1995 |
| EP | 0794230 A2 | 9/1997 |
| JP | 7188634 A | 7/1995 |
| JP | 2006143985 A | 6/2006 |
| WO | 2005042605 A1 | 5/2005 |
| WO | 2008145458 A1 | 12/2008 |

OTHER PUBLICATIONS

Technical Data Sheet for Geniosil STP-E 10, provided by Wacker (2015).*
Technical Data Sheet for Geniosil STP-E 15, provided by Wacker (2015).*
International Search Report from PCT/FR2011/052761 dated May 14, 2012.
Office Action in corresponding Korean Patent Application No. 10-2013-7015930 dated Nov. 29, 2017.
Office Action in corresponding Japan Patent Application No. 10-2013-545459 dated 2015.

* cited by examiner

*Primary Examiner* — Michael J Feely
(74) *Attorney, Agent, or Firm* — Millen, White, Zelano and Branigan, P.C.

(57) ABSTRACT

1) Moisture-crosslinkable adhesive composition comprising:
    from 25% to 50% of a composition (a) formed of a crosslinkable epoxy resin and of a polymer having a polyoxyalkylene or polyurethane main chain connected to a hydrolyzable terminal alkoxysilyl group;
    from 0.5% to 6% of a ketimine (b); and
    from 40% to 65% of an inert inorganic or organic filler (c).
2) Method for laying a wood-based covering, in particular a wide-block parquet flooring, on a flat rigid support comprising the distribution of an effective amount of said adhesive composition in the form of a substantially homogeneous layer.

17 Claims, No Drawings

METHOD FOR LAYING PARQUET FLOORING WITH IMPROVED DIMENSIONAL STABILITY

A subject matter of the present invention is an adhesive composition which is suitable for the laying of wood-based coverings on a flat rigid support in the construction field and in particular for laying parquet flooring. Said laying confers, on the assemblage obtained, an improved dimensional stability over time, very particularly in the case of wide parquet blocks. The invention also relates to the corresponding covering laying method and to said assemblage.

In the construction field, adhesives are widely used for laying wood-based coverings on a flat rigid support. Mention may thus be made of the fitting of paneling to a vertical wall or the laying of wood-based coatings on the ground, such as, for example, parquet flooring. As regards parquet flooring, the rigid support (or substrate) on which it is fixed is generally a slab or screed of concrete (or cement), either untreated or covered with a leveling compound. The substrate can also be an old tiled floor, an old parquet floor, particle boards or plywood.

Parquet flooring is a floor covering based on wood which can be bulk or bonded, the elements of which, essentially rectangular in shape, are denoted by the terms of blocks or slats. Laying parquet flooring on a flat rigid support, for example on a cement screed, is very generally carried out by adhesive bonding, this technique generally being obligatory for heating floors. Subsequent to the adhesive bonding, the parquet blocks thus become integral with the rigid support via an adhesive joint layer, the thickness of which can vary from 0.5 to 5 mm, preferably from 0.5 to 3 mm.

Mention may be made, among the adhesives often used for laying parquet flooring, of solvent-based adhesives, these adhesives being based, for example, on polyvinyl acetate of high molecular weight, which adhesives exhibit constraints on use related to the presence of volatile organic compounds. Adhesives in aqueous dispersion, for example based on polyvinyl acetate of high molecular weight, are also used but exhibit certain restrictions on use as they are not suitable for laying parquet flooring treated beforehand (with varnishes or oils).

Among the adhesives generally used for the adhesive bonding of parquet flooring, compositions based on polymers which can be crosslinked by atmospheric moisture are highly valued, in particular because of their absence of solvent and of volatile organic compound.

There is thus known, in particular via the international application WO 2008/145458, the use of compositions based on a polyether terminated by reactive silane groups. These polyethers are also denoted in the field of the construction industry under the term of polymers modified with silane (or silyl) groups or MS® polymers, available commercially from Kaneka. An example of a commercial product available from this company is MS-S 303H, which has as structure the formula shown on page 3 of the document WO 2008/145458.

During the operation of adhesively bonding the parquet flooring, said polyether reacts, at ambient temperature, with the moisture (present in the atmosphere, the substrate and/or the parquet flooring) via the silyl group, which comprises at least one hydrolyzable group bonded to the silicon atom. This reaction results in the crosslinking of the polymer chains by means of siloxane bonds and in the creation of a three-dimensional network, forming an adhesive joint which renders integral the parquet flooring and the rigid support.

Unlike the rigid support on which it has to be laid, a wood-based covering is composed of a living material which is liable, once attached by adhesive bonding, to react over time by deformations with variations in temperature and in moisture content of the surrounding environment. This is the way it is, for example, with parquet flooring.

The sensitivity of the parquet blocks to the temperature and to the presence of moisture can have the effect of resulting, over time, in a deformation of the blocks in a direction parallel to the horizontal plane of the rigid support. It is because of this deformation that it is standard practice to leave, during the laying of parquet flooring, a free space of 5 to 10 mm (known as expansion gap) along the perimeter of the room in which the parquet flooring is to be laid. This deformation consequently exerts a shear stress on the adhesive joint which remains integrally attached to the rigid support.

The sensitivity of the parquet flooring to the temperature and to the presence of moisture can also be referred to by the undesirable phenomenon of cupping. The latter, which is believed to result from a difference in moisture content between the upper and lower faces of the block, is reflected by a concave deformation of the latter, particularly marked in the vicinity of the edges of the block, which can result in partial detachment and thus in a defect of flatness of the installation harmful in particular to its esthetic appearance.

The problem of cupping is arising with all the more acuteness as there is currently increasing interest in wide-block parquet floorings. This term is understood to denote blocks with a width which exceeds 13 to 14 cm in order for it to sometimes reach up to 19 or 20 cm and which are thus, due to their great width, particularly exposed to the risk of cupping. The deformation of the block exerts a tensile stress on the adhesive joint in a direction essentially perpendicular to the plane of the rigid support.

Solvent-based adhesives, such as those mentioned above in which the adhesive is based on polyvinyl acetate, are well suited to the prevention of cupping due to their very high adhesion.

However, adhesives based on MS® polymers, such as described in the International application WO 2008/145458, exhibit the disadvantage of a lower adhesion than that of the solvent-based adhesives. It is estimated that such a behavior results, at least in part, in the relatively low mechanical strength of the corresponding crosslinked adhesive and in particular in insufficient stiffness. The term "stiffness" is intended to denote the mechanical property quantified by the Young's modulus (or modulus of elasticity), which reflects the deformation of the crosslinked adhesive joint in response to a tensile stress which is applied to it. For one and the same deformation, an adhesive joint having a high modulus of elasticity is capable of withstanding a greater tensile stress.

Compositions comprising a polymer having an oxyalkylene unit and a terminal silane group in which an epoxy resin is incorporated in order to improve the mechanical strength of said crosslinked polymer are known, in particular from patent application EP 794 230.

However, the improvement in the mechanical strength and in particular in the Young's modulus has to be accompanied, in the case of an adhesive composition suitable for laying a parquet flooring and in particular a wide-block parquet flooring, by the maintenance of a minimum ability of the crosslinked adhesive composition to deform, so that the adhesive joint can respond to the various stresses mentioned above, without the risk of breaking or at the very least with a reduced risk of breaking.

It is thus an aim of the present invention to provide a moisture-crosslinkable adhesive composition which gives rise, after it is employed in the field of the construction industry for laying wood-based coverings on a rigid support, to an adhesive joint which exhibits an improved stiffness in combination with a minimum ability to deform under the effect of tensile and/or shear stresses.

Another aim of the invention is to provide such an adhesive composition suitable for laying parquet flooring.

Another aim of the invention is to provide a moisture-crosslinkable adhesive composition which exhibits improved adhesion to a rigid support.

Another aim of the invention is to provide a moisture-crosslinkable adhesive composition offering an improved rate of crosslinking, which is suitable in particular, in the case of parquet flooring, for sufficient maintenance of the blocks allowing people to move over said parquet flooring shortly after it has been laid.

It has now been found that these aims can be achieved, in all or in part, by the composition described below.

The present invention thus relates first to a moisture-crosslinkable adhesive composition comprising:
from 25% to 50% of a composition (a) consisting:
of 5% to 37% of a crosslinkable epoxy resin (a1) of bisphenol A type, and
of 63% to 95% of a polymer (a2) comprising a main chain chosen from (i) a polyoxyalkylene and (ii) a polyurethane which is connected to at least one hydrolyzable terminal alkoxysilyl group, said group being bonded, in the case of a main chain (i), to a divalent alkylene radical of 1 to 4 carbon atoms which is itself bonded to the ends of the chain (i) by a divalent group A having a formula chosen from one of the following formulae:

—O—CO—NH— (Ia)

—NR$^1$—CO—NH— (Ib)

in which R$^1$ represents a hydrogen atom or a $C_1$-$C_3$ alkyl radical;

—S—CO—NH— (Ic);

from 0.5% to 6% of a ketimine (b) as precursor of the crosslinking agent for the epoxy resin (a1); and
from 40% to 65% of an inert inorganic or organic filler (c).

Unless otherwise indicated, the contents of ingredients included in the adhesive composition according to the invention (in particular of (a), (b) and (c)) are expressed in the present text as weight/weight percentages with respect to the total weight of said adhesive composition. The contents of ingredients for the composition (a) are also weight/weight percentages.

The composition according to the invention advantageously exhibits, after crosslinking, an improved mechanical strength corresponding in particular to a Young's modulus of greater than 10 MPa. Furthermore, said crosslinked composition also exhibits—when it is subjected to tensile and/or shear stresses—a very limited risk of failure, as a result of a tensile elongation at break of at least 30% and of a shear elongation at break of at least 200%.

The crosslinkable epoxy resin (a1) of bisphenol A type employed in the mixture (a) is defined, within the meaning of the present invention, as a compound comprising 2 epoxy groups which is capable of being obtained by reaction of haloepoxides, such as epichlorohydrin (also known as 2-(chloromethyl)oxirane) or β-methylepichlorohydrin, with bisphenol A, bisphenol AD or bisphenol F.

Bisphenol A (or 2,2-bis(4-hydroxyphenyl)propane) has the formula:

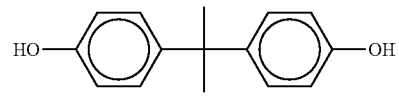

Bisphenol AD (or 1,1-bis(4-hydroxyphenyl)ethane) has the formula:

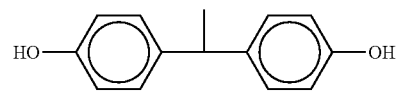

Bisphenol F (bis(4-hydroxyphenyl)methane) has the formula:

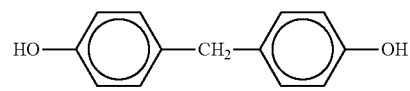

It is preferable to use, as crosslinkable epoxy resin of bisphenol A type, bisphenol A diglycidyl ether (also known under the abbreviation BADGE), of formula:

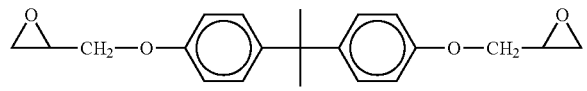

The latter compound is commercially available, for example under the name of D.E.R.™ 331™ from Dow.

Polymers having a hydrolyzable terminal alkoxysilyl group are well known in the field of adhesives. Said group is preferably an alkoxysilyl radical having the formula:

$$—Si(R^2)_p(OR^3)_{3-p}$$ (II)

in which:
R$^2$ and R$^3$, which are identical or different, each represent a linear or branched alkyl radical of 1 to 4 carbon atoms, with the possibility, when there are several R$^2$ or R$^3$ radicals, that these are identical or different;
p is an integer equal to 0, 1 or 2.

Generally, the mean number of terminal alkoxysilyl groups per main chain of the polymer (a2) is equal to approximately 2, each group being located at an end of the chain.

Preferably, the alkoxysilyl radical is chosen from the radicals of following formulae:

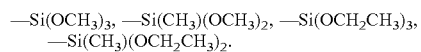

The main chain of the polymer (a2) can be a polyoxyalkylene (i). It then corresponds to a repeat unit of formula:

—R$^4$—O— (III)

in which R$^4$ is a linear or branched alkylene group comprising from 1 to 5 carbon atoms.

It is possible to give, as specific examples of the repeat unit of formula (III), the following radicals:

—CH$_2$O— —CH$_2$CH$_2$O— —CH$_2$CH(CH$_3$)O—
—CH$_2$CH(C$_2$H$_5$)O— —CH$_2$C(CH$_3$)$_2$O—
—CH$_2$CH$_2$CH$_2$CH$_2$O—

According to a preferred alternative form, the repeat unit of formula (III) is:

—CH$_2$CH(CH$_3$)O— i.e. an isopropoxy unit, corresponding to a polypropylene glycol main chain.

In the case of a main chain (i), each terminal alkoxysilyl group is bonded to a divalent alkylene radical of 1 to 4 carbon atoms which is itself bonded to the ends of the chain (i) by the divalent group A defined above.

Preferably, the alkylene radical represents one of the radicals of formula —CH$_2$— or —CH$_2$—CH$_2$—CH$_2$— and the divalent group A is the urethane functional group (formula Ia).

According to an embodiment which is even more particularly preferred for the improved rate of crosslinking of the adhesive composition, the alkylene radical is a methylene radical of formula —CH$_2$—.

The polymers (a2) having (i) for main chain can be prepared by processes known per se, such as by reaction of polyoxyalkylenes having an —OH ending with an isocyanatosilane in which the isocyanato group is connected to the silane group by an alkylene radical of 1 to 4 carbon atoms. Patents US 2005/0119421 and US 2004/0181025 give examples of these processes.

Mention may be made, as commercial example of such polymers, of Geniosil® STP-E 10, sold by Wacker, each of the 2 terminal silyl groups of which has the formula: —Si(CH$_3$)(OCH$_3$)$_2$ and is connected directly, via the —O—CO—NH—CH$_2$— group, to an end of the polypropylene glycol main chain.

The main chain of the polymer (a2) can be, in accordance with a preferred alternative form of the adhesive composition according to the invention, a polyurethane (ii). Such a polyurethane is obtained by condensation of a polyisocyanate with a polyol, preferably a polyether polyol or a polyester polyol. The corresponding polymer (a2) can be prepared by processes known per se, for example as described by the patents:

U.S. Pat. Nos. 3,632,557, 3,979,344, 5,298,572, WO 93/05089, EP 770 633 and EP 1 178 069.

Mention may be made, as commercial examples of such polymers, of:

Desmoseal® S XP 2636, sold by Bayer Material Science;
Spur+* Y 15986 and Spur+* Y 15987 from Momentive.

According to another preferred alternative form, the content of crosslinkable epoxy resin (a1) of bisphenol A type included in the composition (a) ranges from 10% to 33% and the content of polymer (a2) in this same composition ranges from 67% to 90%.

The composition according to the invention comprises from 0.5% to 6% of a ketimine (b) as precursor of the crosslinking agent for the epoxy resin (a1).

Preferably, the ketimine (b) has the formula:

(R$^6$R$^7$C=N)$_q$R$^5$          (IV)

in which:
R$^5$ is an organic radical having from 1 to 3 free valences, preferably chosen from a C$_1$-C$_{12}$ alkyl or a C$_6$-C$_{24}$ aryl, which are optionally substituted;

R$^6$ and R$^7$, which are identical or different, represent a hydrogen atom, a phenyl group or an alkyl group comprising from 1 to 6 carbon atoms, which is optionally substituted;
q is an integer equal to 1, 2 or 3.

Such ketimines can be prepared by conventional reactions for the condensation of an amine with a carbonyl compound, as described in the abovementioned application EP 794 230.

The ketimine is present in a stable manner in the composition according to the invention packaged with exclusion of moisture. When the composition is applied as adhesive, the ketimine decomposes under the action of atmospheric moisture or of the moisture present in the substrates to form a primary amine and a ketone. The primary amine thus formed reacts with the epoxy resin (a1) at ambient temperature as crosslinking agent for the latter.

According to a preferred alternative form of the invention, use is made of the ketimine (b) of formula (IV) in which:
q=2;
R$^5$ is the divalent radical derived from isophorone, of formula:

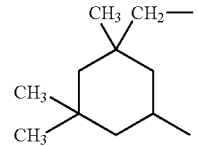

R$^6$ is a methyl and R$^7$ is an isobutyl.

Such a ketimine is commercially available from Bayer under the name Desmophen® LS 2965A.

The adhesive composition which is the subject matter of the invention also comprises from 40% to 65% of an inert inorganic or organic filler (c), the role of which is to reinforce the adhesive joint obtained after crosslinking.

The inert inorganic or organic fillers which can be used are in the pulverulent form and are chosen, for example, from carbonates (calcium carbonate or magnesium carbonate), anhydrous or hydrated silicic acid, quartz, silica, in particular fumed silica, silicates (of calcium, sodium, potassium, aluminum or magnesium), in particular magnesium silicates which are optionally hydrated (talc), calcium oxide, metals and their oxides, in particular titanium oxide, carbon black, clay, cellulose or wood powder (or flour). These fillers are generally in the form of particles with a size of between approximately 1 and 50 μm.

An inorganic filler chosen from calcium carbonate or a fumed silica is preferred.

According to a particularly preferred embodiment of the composition according to the invention, the composition comprises:
a content of the composition (a) within the range extending from 30% to 40% and more preferably still from 30% to 35%;
a content of ketimine (b) varying from 1% to 5%; and
a content of the inorganic filler (c) ranging from 50% to 60% and more particularly advantageously from 55% to 60%.

The adhesive composition according to the invention can optionally comprise up to 1% of a crosslinking catalyst which can be any catalyst known by a person skilled in the art for the condensation of silanol, i.e. generally amines or organometallic derivatives, and in particular organic derivatives of iron, of divalent or tetravalent tin, of titanium or of aluminum, the majority of which are commercially available.

Mention may thus be made, as examples of catalysts of organotin type, of: dibutyltin dilaurate, dibutyltin diacetylacetonate or dioctyltin diacetylacetonate. Dibutyltin diacetylacetonate is available from TIB Chemicals under the name TIB KAT® 226.

A content for said catalyst of 0.05% to 0.6% is more particularly preferred.

In addition, the adhesive composition according to the invention can comprise up to 10% of a plasticizer chosen, for example, from phthalates or mineral oils of petroleum origin, liquid paraffins, polyolefins or the mixtures of these substances. Mention may be made, as example of commercial product, of Hydroseal G3H (from Total), which is a mixture of hydrotreated middle oil distillates having a viscosity (measured at 23° C. with a Brookfield viscometer equipped with the 2V100 rotor according to standard ASTM D 445) of 24 MPa·s.

It is preferable to monitor the moisture content of the composition according to the invention so as to prevent immediate crosslinking of the polymer (a2) resulting in an increase in the viscosity or even in the solidification of the composition during its storage. The moisture can be introduced into the composition by some of its ingredients, for example by the inorganic filler (c).

For this reason, the composition according to the invention can comprise one or more dehydrating agents (or moisture scavengers). Appropriate dehydrating agents are in particular alkoxysilanes, such as trialkoxysilanes (in particular trimethoxysilanes) and alkoxysilanes comprising an amino, mercapto or epoxy group. It is possible to give, as examples thereof, vinyltrimethoxysilane, γ-glycidyloxypropyltrimethoxysilane, N-(β-aminoethyl)-γ-aminopropyltrimethoxysilane, aminopropyltrimethoxysilane or trimethoxymethylsilane. An amount of dehydrating agents in the composition of between 0.5% and 5%, preferably in the vicinity of 1%, will generally be suitable.

Some of these compounds can also act as adhesive-promoting agent, in particular the trialkoxysilanes comprising an amino, mercapto or epoxy group. An amount of 0.5% to 2% will generally be appropriate.

The composition according to the invention can also comprise from approximately 0.5% to 2% of a reactive diluent of fatty alcohol glycidyl ether type.

The composition according to the invention is prepared by simple mixing of its ingredients at ambient temperature after drying the inert filler (c).

The invention also relates to a method for laying a wood-based covering on a flat rigid support, comprising a stage of distributing, over the surface of said support, an effective amount of the moisture-crosslinkable adhesive composition as defined above.

According to a preferred alternative form of the method, the wood-based covering is a parquet flooring and advantageously a parquet flooring having blocks with a width of between 13 and 20 cm.

The adhesive composition is advantageously distributed over the support in the form of a substantially homogeneous layer by means, for example, of a serrated spreader, this mode of application being denoted in the trade by the name of "full adhesive bonding". The amount of adhesive composition applied to the support can vary within a wide range extending, for example, from 0.8 to 3.5 kg per m².

Finally, the invention relates to an assemblage comprising a flat rigid support covered with a wood-based covering via a substantially homogeneous layer of the adhesive composition (as defined above) which is crosslinked and forms an adhesive joint. The thickness of the adhesive joint layer is generally between 0.5 and 5 mm, preferably between 0.5 and 3 mm.

The assemblage in which said covering is a parquet flooring and can be used as floor is more particularly preferred.

The following examples are given purely by way of illustration of the invention and should not be interpreted so as to limit the scope thereof.

EXAMPLES 1 TO 5

Moisture-crosslinkable adhesive compositions are prepared by simple mixing at ambient temperature of the ingredients shown in the following table, after drying the inert filler (c). In addition to these ingredients, the composition also comprises 1.5% of dehydrating and adhesion-promoting agents, 1% of reactive diluent, 0.5% of a fumed silica and 5% of Hydroseal G3H.

The adhesive compositions obtained are subjected to the following measurements and test.

Measurement of the Young's Modulus and of the Tensile Elongation at Break of the Crosslinked Composition:

This measurement is carried out in accordance with standard NF ISO 37.

A dumbbell test specimen of Type 1 (length of the narrow part of the dumbbell equal to 25 mm for a width of 6 mm and a thickness of 2 mm) is obtained by cutting out with a hollow punch from a film of the adhesive composition crosslinked beforehand after residing for 7 days in an atmosphere maintained at 23° C. and 50% relative humidity.

The test specimen thus obtained is drawn in a tensile testing machine, the movable jaw of which moves at a constant rate equal to 50 mm/minute. The stress applied and the elongation of the test specimen (expressed as %) during the drawing thereof and at the time of the failure thereof are recorded.

The Young's modulus (expressed in MPa) is the slope of the tangent to the origin of the curve plotting the tensile stress as a function of the elongation.

The results are shown in the table.

Measurement of the Elongation at Break by Shearing of the Crosslinked Composition:

An assemblage of 2 parquet blocks adhesively bonded by means of the adhesive composition is prepared in accordance with standard NF EN 14293.

Two rectangular oak blocks with a length of 14 cm, a width of 2.4 cm and a thickness of 1 cm are used.

The adhesive composition is applied so as to obtain adhesive bonding by overlapping the 2 blocks over a surface area of approximately 600 mm², the thickness of the adhesive layer being 1 mm.

The crosslinking of the composition resulting in the formation of the adhesive joint is obtained by maintaining the assemblage at 23° C. and 50% relative humidity for 7 days.

The assemblage thus obtained is inserted into the jaws of a tensile testing machine and a tensile force is applied at a constant rate equal to 20 mm/minute, resulting in the shearing of the adhesive joint, until the latter fails.

The value of the elongation is determined (as %) and recorded in the table.

Test of the Adhesion of Parquet Flooring Adhesively Bonded to a Concrete Slab:

The adhesion obtained for a parquet flooring adhesively bonded to a concrete slab by employing the adhesive composition is evaluated according to standard NF EN 14293.

Use is made of a square concrete slab with a side length of 50 cm and a thickness of 5 cm.

The adhesive composition is uniformly distributed over the surface of this slab using a serrated spreader, so as to deposit, on said surface, an adhesive layer corresponding to a total amount (or dose) of 1 kg/m², corresponding to a thickness of 0.6 mm.

Pieces of parquet flooring made of rough bulk oak, with dimensions of 50 mm×50 mm×10 mm, are applied in the fresh adhesive layer, in a proportion of 10 pieces per slab, separated by approximately 50 mm.

The slab thus coated is subsequently stored at ambient temperature for 7 days.

The strength of resistance to the separation (or tearing off) between a piece of parquet flooring and the support made of concrete, under the effect of a tensile force exerted in a direction perpendicular to the plane of the slab, is then measured.

The tensile force is generated by means of a dynamometer and is transmitted to the piece of parquet flooring via a metal rod, the base of which substantially covers the piece and which is profiled in a T shape.

This metal rod is rendered integral with the piece of parquet flooring by adhesively bonding its base using an epoxy adhesive, the adhesive joint obtained having a cohesion very much greater than that of the bond between the piece and the concrete surface. The vertical portion of the metal rod (corresponding to the vertical bar of the T) is rendered integral with the shaft of the dynamometer by a pin.

A tensile test is then carried out and the value of the resistance to tearing off, expressed in MPa, is recorded, which value is shown in the table.

EXAMPLE 6 (COMPARATIVE)

Example 1 is repeated, the Spur+* Y 15987 being replaced with MS-S 303H. MS-S 303H is a polymer available from Kaneka, having the structure:

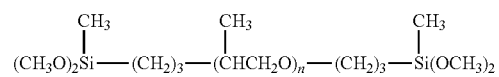

The results obtained are shown in the table.

EXAMPLE 7 (COMPARATIVE)

Example 3 is repeated, the Geniosil® STP-E 10 being replaced with MS-S 303H. The results shown in the table are obtained.

EXAMPLE 8 (COMPARATIVE)

Example 1 is repeated using the contents shown in the table for the components of the composition (a) and for the other ingredients of the adhesive composition. The results shown are obtained.

TABLE

| | | Example | | | | | | | |
|---|---|---|---|---|---|---|---|---|---|
| Components | | 1 | 2 | 3 | 4 | 5 | 6 (comp.) | 7 (comp.) | 8 (comp.) |
| Content of components of the composition (a) (in %) | D.E.R.™ 331™ (a1) | 10 | 25 | 33 | 33 | 33 | 10 | 33 | 40 |
| | Geniosil® STP-E 10 (a2)(i) | — | — | 67 | — | — | — | — | — |
| | Desmoseal® S XP 2636 (a2)(ii) | — | — | — | 67 | — | — | — | — |
| | Spur+* Y 15986 (a2)(ii) | — | — | — | — | 67 | — | — | — |
| | Spur+* Y 15987 (a2)(ii) | 90 | 75 | — | — | — | — | — | 60 |
| | MS-S 303H | — | — | — | — | — | 90 | 67 | — |
| Content of components of the composition (in %) | Composition (a) | 31.5 | 31.5 | 31.5 | 31.5 | 31.5 | 31.5 | 31.5 | 31.5 |
| | Desmophen® LS 2965 A (b) | 1.2 | 3 | 4 | 4 | 4 | 1.2 | 4 | 4.8 |
| | Calcium carbonate (c) | 58.73 | 57.03 | 56.40 | 56.40 | 56.40 | 58.73 | 56.40 | 55.32 |
| | TIB KAT® 226 | 0.57 | 0.47 | 0.10 | 0.10 | 0.10 | 0.57 | 0.10 | 0.38 |
| Young's modulus (in MPa) | | 12 | 19 | 15 | 11 | 16 | 3 | 9 | 46 |
| Tensile elongation at break (in %) | | 36 | 44 | 86 | 118 | 56 | 198 | 115 | 24 |
| Shear elongation at break (in %) | | 200 | 210 | 294 | 341 | 214 | 361 | 277 | 168 |
| Adhesion (in MPa) | | 3.1 | 2.8 | ND | ND | 2.5 | 2.1 | 3.1 | 3.3 |

ND = Not Determined

The invention claimed is:

1. A moisture-crosslinkable adhesive composition comprising:
   from 25% to 50% of a composition (a):
      of 5% to 37% weight/weight of a crosslinkable epoxy resin (a1) of bisphenol A type, and
      of 63% to 95% weight/weight of a polymer (a2) comprising a main chain of (i) a polyoxyalkylene or (ii) a polyurethane, which is connected to two hydrolyzable terminal alkoxysilyl groups, said groups being bonded, in the case of a main chain (i), to a methylene radical which is itself bonded to the ends of the chain (i) by a divalent group A having one of the following formulae:

—O—CO—NH— (Ia);

—NR$^1$—CO—NH— (Ib), in which R$^1$ represents a hydrogen atom or a $C_1$-$C_3$ alkyl radical; and —S—CO—NH— (Ic);

from 0.5% to 6% of a ketimine (b) as precursor of a crosslinking agent for the epoxy resin (a1); and
from 40% to 65% of an inert inorganic or organic filler (c);
the contents of ingredients (a), (b) and (c) being expressed as weight/weight percentages with respect to the total weight of said adhesive composition, wherein the hydrolysable terminal alkoxysilyl groups have the formula:

—Si(R$^2$)$_p$(OR$^3$)$_{3-p}$ (II)

in which:
each R$^2$ and R$^3$ independently represents a linear or branched alkyl radical of 1 to 4 carbon atoms; and P=1.

2. The adhesive composition as claimed in claim 1, wherein crosslinkable epoxy resin (a1), is bisphenol A diglycidyl ether of formula:

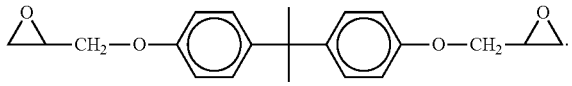

3. The adhesive composition as claimed in claim 1, wherein the polymer (a2) has a polypropylene glycol main chain (i) and the divalent group A is of formula (Ia).

4. The adhesive composition as claimed in claim 1, wherein the polymer (a2) has a polyurethane (ii) for main chain.

5. The adhesive composition as claimed in claim 1, wherein the content of crosslinkable epoxy resin (a1) included in the composition (a) is 10% to 33% and the content of polymer (a2) in this same composition is 67% to 90%.

6. The adhesive composition as claimed in claim 1, wherein the ketimine (b) has the formula:

(R$^6$R$^7$C=N)$_q$R$^5$ (IV)

in which:
R$^5$ is an organic radical having from 1 to 3 free valences;
R$^6$ and R$^7$, which are identical or different, represent a hydrogen atom, a phenyl group or an alkyl group having 1 to 6 carbon atoms, which is optionally substituted;
q is an integer equal to 1, 2 or 3.

7. The adhesive composition as claimed in claim 6, wherein the ketimine (b) has formula (IV) in which q is equal to 2, R$^5$ is a divalent radical derived from isophorone, R$^6$ is methyl and R$^7$ is isobutyl.

8. The adhesive composition as claimed in claim 6, wherein R$^5$ is optionally substituted $C_{1-12}$-alkyl or $C_{6-24}$-aryl.

9. The adhesive composition as claimed in claim 1, wherein the inorganic filler (c) is calcium carbonate or a fumed silica.

10. The adhesive composition as claimed in claim 1, comprising:
a content of the composition (a) of 30% to 40%;
a content of ketimine (b) of 1% to 5%; and
a content of the inorganic filler (c) of 50% to 60%.

11. The adhesive composition as claimed in claim 1, wherein the polymer (a2) has a polyoxyalkylene (i) for main chain and divalent group A is of formula (Ia).

12. The adhesive composition as claimed in claim 1, wherein polymer (a2) has the formula (R$^3$O)$_2$(R$^2$)Si—CH$_2$—NH—C(O)—O-polyoxyalkylene-C(O)NH—CH$_2$—Si(R$^2$)(OR$^3$)$_2$ wherein each R$^2$ and R$^3$ independently represents a linear or branched alkyl radical comprising 1 to 4 carbon atoms; and
wherein the polyoxyalkylene corresponds to a repeat unit of —R$^4$—O—, in which R$^4$ represents a linear or branched alkylene comprising from 1 to 5 carbon atoms.

13. A method for laying a wood-based covering on a flat rigid support, comprising distributing, over the surface of said support, an effective amount of the adhesive composition as defined in claim 1.

14. The laying method as claimed in claim 13, wherein the wood-based covering is a parquet flooring.

15. The laying method as claimed in claim 13, wherein the adhesive composition is distributed over the support in the form of a substantially homogeneous layer.

16. An assemblage comprising a flat rigid support covered with a wood-based covering via a substantially homogeneous layer of the adhesive composition, as defined in claim 1, which is crosslinked and forms an adhesive joint.

17. The assemblage as claimed in claim 16, wherein the covering is a parquet flooring that can be used as a floor.

* * * * *